United States Patent [19]

Chervenak

[11] 4,165,852

[45] Aug. 28, 1979

[54] WALL RAIL WITH CHANNELS

[75] Inventor: Robert A. Chervenak, Seattle, Wash.

[73] Assignee: Comerco, Inc., Tacoma, Wash.

[21] Appl. No.: 791,318

[22] Filed: Apr. 27, 1977

[51] Int. Cl.² ............................................. F16M 13/00
[52] U.S. Cl. .................................... 248/225.2; 312/245
[58] Field of Search ............. 312/245; 248/201, 223.4, 248/224.2, 225.2

[56] References Cited

U.S. PATENT DOCUMENTS

| 846,022 | 3/1907 | Ficener | 248/222.1 |
|---|---|---|---|
| 3,071,350 | 1/1953 | Opie | 248/224.2 |
| 3,222,116 | 12/1965 | Levenberg | 312/245 |
| 3,330,518 | 7/1967 | Adler | 248/224.2 |
| 3,346,314 | 10/1967 | Acton | 312/245 |
| 3,714,907 | 2/1973 | Michieli | 248/225.1 |
| 4,008,872 | 2/1977 | Thompson | 248/224.2 |

Primary Examiner—William H. Schultz
Attorney, Agent, or Firm—Gipple & Hale

[57] ABSTRACT

A wall rail is secured to a vertical wall by conventional fastening means. The rail facilitates the hanging of cabinets or modular cell units. The wall rail includes a channel which is closed off from the room environment. The channel facilitates the passage of electrical wires, and other life supporting conduits, around the perimeter of the room without the wires or conduits being unsightly or unnecessarily contaminated.

10 Claims, 6 Drawing Figures

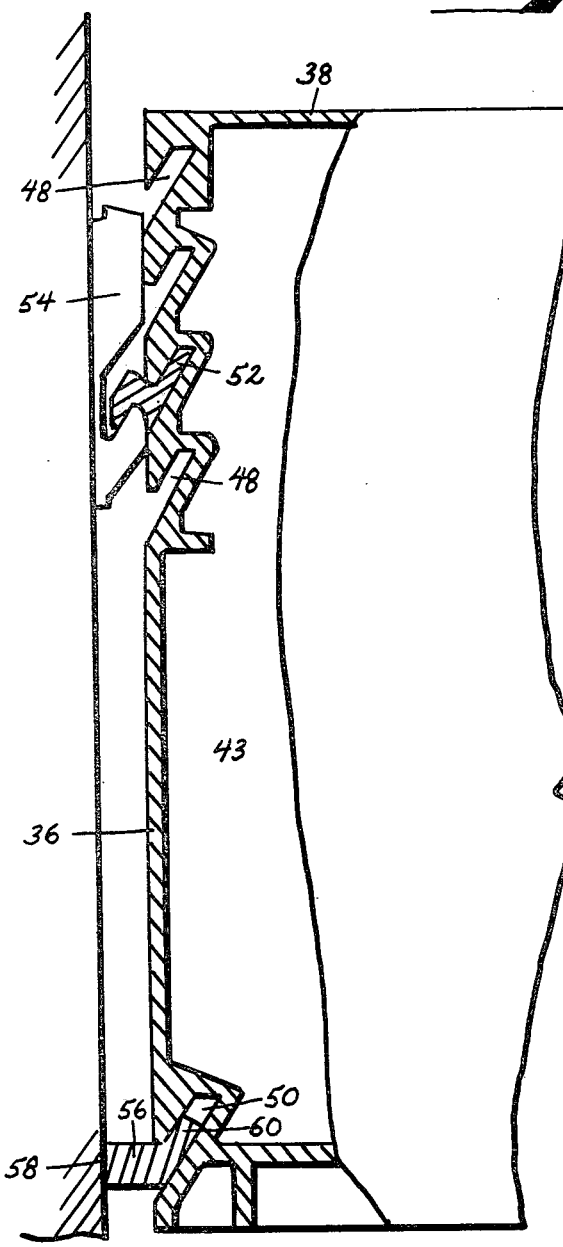
Fig. 2.
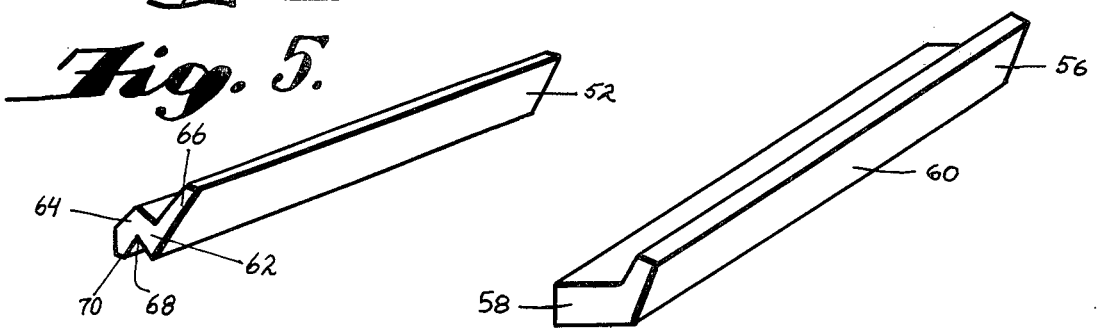
Fig. 5.
Fig. 6.

WALL RAIL WITH CHANNELS

BACKGROUND OF THE INVENTION

This invention generally relates to the field of unitary modular cell units which are useful in organizing and storing smaller items. The modular cell units serve in the same capacity as a storage cabinet. More specifically, the modular cell can be employed in a hospital setting for the storage of a patient's personal belongings, clothing or medicines.

The modern hospital faces unique and frustrating problems. Hospitals provide a multitude of services, each demanding improvement and each threatened by rising costs and obsolescence. Many indepedent products and subsystems are frequently in wasteful conflict with each other. In order to provide good service, the hospital must have coherent performance. Although hospital sanitary procedures and controls have made great strides, they are finally reduced to a practice of overcompensation to balance the unsanitizable character of many hospital equipment structures. This group of "unsanitizable" would include most furniture, professional equipment, transporting devices, containers and storage units of a size larger than a bread box. All surfaces, without exception, should and need to be clearly accessible for removal of contaminated material and for sterilization. There should be no seams, no cracks, no interior grooves, no hinges and no unsealed shell interiors penetrable by air or liquid flow in order to preserve a sanitary atmosphere. With rare exception, present structures do not lend themselves to disassembly for proper cleaning.

In operating a hospital, it has increasingly become apparent that the visible physical characteristics of the patient's room or surroundings can indeed have a profound impact on the psychological outlook of the patient. It is also well established that a happy patient generally feels physically better than an unhappy one. These rather obvious conclusions dictate a style for a designer of hospital equipment and furniture. In order to be aesthetically pleasing to the patient and yet maintain extreme functionality, a system of unitary modular cell units is constructed. Each individual cell unit is capable of storing a plurality of items of various shapes and sizes in an extremely aesthetically pleasing manner. Each cell unit is constructed of a hard, resilient and durable plastic which allows the units to be molded as one solid piece thereby eliminating any unsightly seams. The elimination of seams tends to substantially decrease the degree of impurities maintained in a structure after sterilization. The elimination of seams also tends to increase the cell unit's structural rigidity.

A plurality of cell units can be used in a patient's room. The units are secured to the walls of the room by being attached to a wall rail which rail is fastened to the room wall at an appropriate height. The modular cell unit is secured to the wall by means of a mounting key which fits and is held by both the unit's rear surface and the wall rail. As the units are readily detachable from the walls they can be sterilized each and every time a new patient occupies a particular room. This obviously leads to a more sanitary hospital environment in addition to preventing the transfer of disease or germs from patient to room articles to new patient.

Additionally, the modular cell units are provided with drawers, pull trays or shelves which slide in and out of the front of the cell unit. The storage drawers, shelves or pull trays can be "mixed & matched" to provide a variety of cell unit configurations. Quite obviously the flexibility of the unit to take on a plethora of functional embodiments is a tremendous advantage to the hospital. The cell drawers, shelves or pull trays are also constructed of heavy duty plastic and therefore can be sterilized after removal.

A variety of front doors can be selectively secured to the modular cell unit. Specifically, the cell can be provided with a side-hinged front door, a drop-front door, or a roll-top front door. The modular cell unit is also provided with a vertical and horizontal trackway which guides the drop-front door and the roll top door. Both of these doors are stored in the modular cell when placed in their inoperative position.

The present system of containers, frames, trays, drawers, carts and wall rails coordinate the architectural and service functions of the hospital. The following individual features of the present system contribute to the system validity.

Improved sanitary procedures require a system to be dishwashable. As mentioned, the present system is made of tough resilient plastic and therefore able to withstand vigorous industrial dishwashing. The present modular cell unit is without seams, nor sharp corners and also is provided with drainage holes to allow for water to easily drain. Additionally, the surfaces of the unit are readily assessible to dishwashing jets. As all parts readily disassemble, they may be sanitized by use of a conventional industrial dishwasher.

The use of the cell system in modular form allows the hospital to selectively replace those items whose function and/or appearance have failed. In this manner, the hospital can eliminate the "grey life" failure in structures.

DESCRIPTION OF THE PRIOR ART

U.S. Pat. No. 3,212,646 discloses a support system for detachably supporting a modular cell unit to a generally plane vertical surface, i.e., a wall. A longitudinal rail is formed or secured to the rear of the furniture piece. A correspondingly mating wall rail, secured to the wall of a room, is "hooked" onto by the furniture rail. In this manner, furniture is secured to various parts of a room.

SUMMARY OF THE INVENTION

The present system comprises a modular cell unit with one open face. The open face provides an entrance and cavity for the selective withdrawal and storage of trays or drawers located and held within the unit. The entire modular cell is readily secured to a wall in a hospital room by means of a wall rail and mounting key. The rear surface of the modular cell unit is provided with a plurality of horizontally extending slots into which a "mounting key" is selectively inserted for adjusting the relative height of the unit with respect to the floor of the room. The other end of the "mounting key" is fixedly held in a groove provided by the wall rail. At the bottom of the rear surface of the modular cell is another horizontally extending slot which provides an opening for a leveling key. This key is inserted therein and provides a rear planar surface which abuts against the vertical wall of the room and thereby keeps the entire modular cell in a horizontal level condition.

Additionally, the wall rail of the system is provided with a hidden electrical trackway which travels the entire length of the wall rail. The electrical trackway allows electrical wires to run around a hospital room without unsightly wires being visible.

The above mentioned purposes are more readily apparent when read in conjunction with the following detailed description of the preferred embodiment of the present invention.

BRIEF DESCRIPTION OF THE DRAWINGS

FIG. 2 is a cross sectional view of the wall rail, key, leveling key and modular cell unit, FIG. 5 is a perspective view of the wall rail and, FIG. 6 is a perspective view of the leveling key.

DETAILED DESCRIPTION OF THE DRAWINGS

Figure 1:
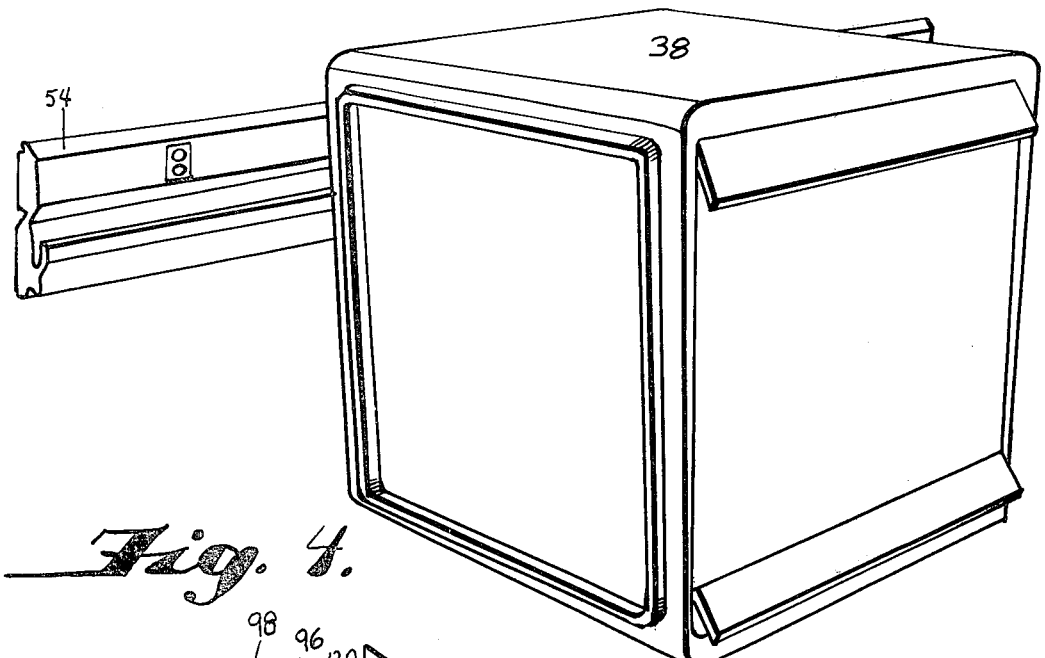
FIG. 1 is a perspective view of a modular cell unit shown attached to a wall rail.

The modular cell unit 30 comprises two outside walls 32 and 34, rear wall 36, top surface 38 and bottom 40. The entire modular cell unit and its complementary components are constructed of a relatively strong, heat-resistant plastic material. The modular cell unit is constructed without any sharp corners or seams between adjacent wall surfaces. The absence of any seams prolongs the unit's life span. The absence of the seams also prohibits any water from being trapped within the unit for any appreciable length of time. Additionally, the absence of sharp corners on the cell provides an aesthetic pleasing effect as well as an added safety feature.

Outside wall abutment surfaces or spacing ridges 44 and 46 extend outwardly from outside walls 32 and 34 respectively. These spacing ridges extend outwardly from the planar surface of the side walls. Additionally, the outside wall abutment surfaces are recessed inwardly from the outside perimeter of the side walls. The ridges are parallel to the outside perimeter of the side walls, yet recessed inwardly as previously mentioned. When two modular cell units are placed immediately adjacent to each other these outside wall abutment surfaces will contact each other at their planar contact surfaces. Consequently, the two modular cells will be spaced apart a uniform distance. The outside wall abutment surfaces or spacing ridges 44, 46 add structural rigidity to the two adjacent units. Additionally, the abutment of the adjacent outside wall abutment surfaces prevents the accidental lodging of any foreign objects between the units and also prevents any objects from falling off the top surface of the unit to the floor. The uniform spacing provided between adjacent modular cell units provides an aesthetically pleasing appearance, which is especially important in hospital environments.

In an alternate embodiment, the ridges of the side walls can be formed so as to interlock with the ridges of adjacent modular cell units.

Figure 3:
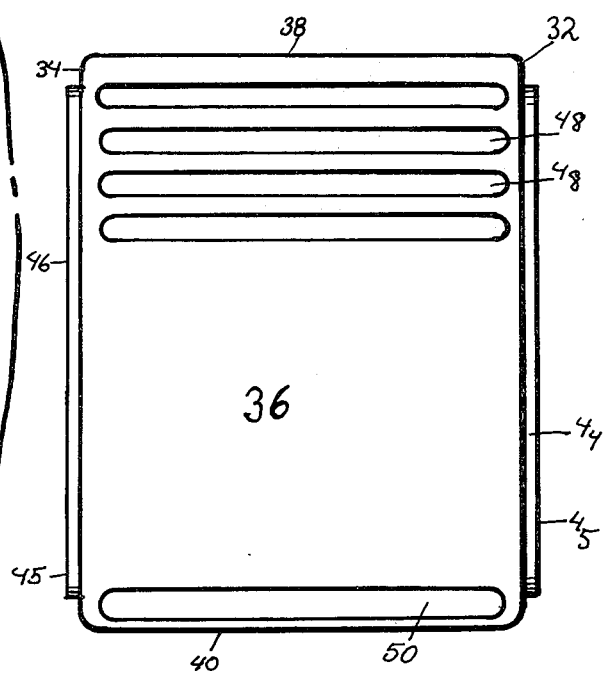
FIG. 3 is a rear elevational view of the modular cell unit.

As best seen in FIGS. 2 and 3, the rear wall 36 is provided with a plurality of top horizontally extending slots 48. The slots extend vertically upward into the rear of the cavity 43 of the modular cell unit. A mounting key 52, as will be subsequently described, is inserted into the desired top longitudinal slot 48 in order to adjust the height of the modular cell unit with respect to the wall rail. One leg of the mounting key 52 is secured into the selected horizontal slot 48 while the other leg of the mounting key is held in place by the wall rail 54. The legs of mounting key 52 matingly engage with the slots 48 and the wall rail 54. In this manner, the relative height of the modular cell unit can be adjusted without the need of requiring a multitude of unsightly wall rails.

A lower leveling slot 50 is also provided in the rear wall 36 of the modular cell unit 30. The lower leveling slot is horizontally located at the lower portion of the rear wall. This lower level slot 50 matingly receives a leg of the leveling key 56 in a manner similar to how the top horizontal slots 48 receive key 52. The other leg of the leveling key 56 is provided with a flat surface and is constructed to rest flush against the wall of the room. In this manner, the modular cell unit can be vertically adjusted by selecting the desired horizontal slot within which the mounting key 52 is to be placed, while the leveling key is always placed in the lower leveling slot 50 in order to space the lower edge of the rear wall 36 of the modular cell from the wall of the room. The leveling key, therefore, serves the important function of keeping the top surface 38 of the modular cell unit 30 in a level orientation with respect to the floor of the hospital room.

The leveling key 56 comprises a wall contact surface 58 and a vertically inclined slot-engaging leg 60. In operation, the slot-engaging leg 60 slides upwardly into the lower leveling slot 50. The leveling key and corresponding slot are constructed so that the key will remain with the unit unless the key is intentionally physically removed from the leveling slot. The fact that the key remains with the unit facilitates any change of position of the cell.

The mounting key 52 as best shown in FIG. 5, is comprised of two legs 62 and 64. Leg 62 slides upwardly into the selected top longitudinal slot 48. The leg 62 and all slots are constructed so that after the key is placed in an appropriate slot it is there held until actual physical removal takes place. This facilitates the movement of the entire modular cell from one position on the wall rail to another wall rail located elsewhere. The width across the lower portion of leg 62, at the point where the leg 62 turns into leg 64, is a greater width than the width across the tip 66 of the leg. The tip 66 is the first part of the wall rail to enter into the slots 48. Due to the increased width across the leg, the mounting key 52 is frictionally held in place by the top longitudinal slot's side walls. Leg 64 engages the channel formed within the wall rail. Leg 64 is comprised of a surface 68 which engages the wall rail. The tip 70 of the leg 64 is the first section to enter into the channel 72. The ledge engaging surface 68 of leg 64 sits upon ledge 76 of the wall rail. When the mounting key 52 is placed in the selected longitudinal slot 48 and the leg 64 is placed within the channel 72 of the wall rail 54 the entire unit is suspended and securely held by the wall rail. The cantilever action of the modular cell is held in abatement by the leveling key 56. The weight of the modular cell unit is supported by the ledge 76 of the wall rail 54.

As previously mentioned, the mounting key and the leveling key will remain attached to the rear of the modular cell unit unless they are physically intentionally removed. If the modular cell unit is not to be held on the wall but rather stored on the floor or on one of its associated bases then both the mounting key and rail key should be removed. The removal of the two keys facilitates storage of the units as the rear of the modular cell may now be placed flush against a wall. This is obviously not possible where the mounting key and/or leveling key are fixedly attached to the modular cell.

Figure 4:
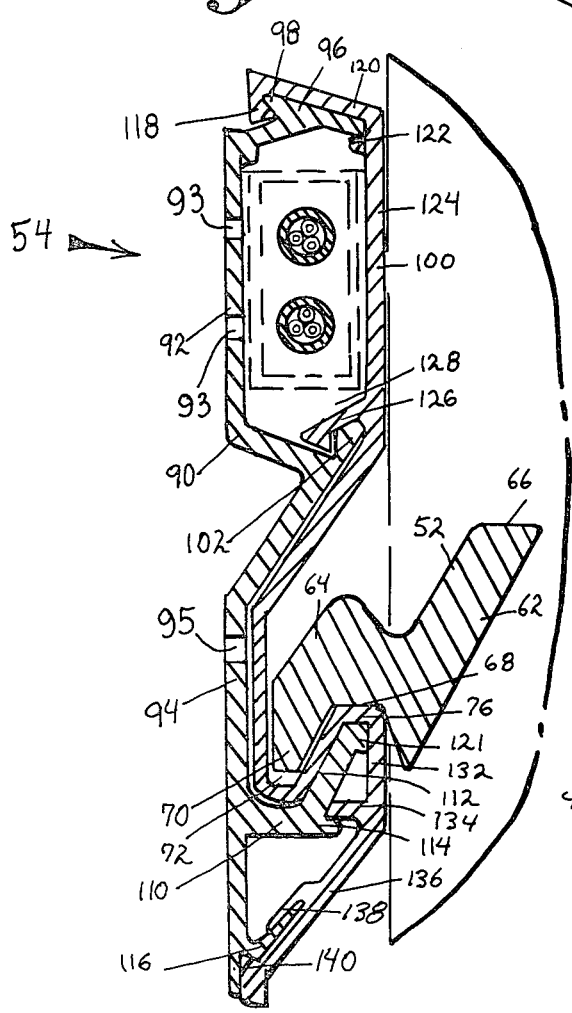
FIG. 4 is an enlarged cross sectional view of the wall rail and key.

The wall rail 54 is comprised of two main segments. A wall bracket 90 is first secured to the hospital's room's wall by means of suitable fasteners. The wall bracket is secured to the wall at an appropriate height such that the lower edge of the bracket is parallel to the floor of the room. The wall bracket 90 is composed of a strong metal (e.g. aluminum or steel). As shown best in FIG. 4, the wall bracket 90 has two wall-engaging flat surfaces 92 and 94. At suitable points along these flat surfaces, fasteners are drilled through the wall bracket and secured to the wall or the wall bracket may be provided with apertures 93 and 95 to accommodate the fasteners. At the top of the flat surface 92, the wall bracket forms a top piece 96 which extends substantially away from the wall of the room. A catch 98 is provided at the rearmost portion of the top piece 96. This catch 98 serves to keep the wall bracket cover piece 100 from being pulled away from the wall bracket 90. At the lower portion of flat piece 92 the wall bracket turns away from the wall to form wall bracket gripping leg 102. Flat piece 94 has at its lower end a perpendicular ledge 110 which terminates in an upwardly inclined segment 112, inclined away from the wall. The perpendicular ledge 110, flat piece 94, and inclined segment 112 form a "U" shape, hereinafter referred to as channel 72 of the wall rail. At the outermost edge of the perpendicular piece 110 is a lip 114. The lowermost portion of flat piece 94 has an incline 116 which extends upwardly and away from the wall bracket.

A hard plastic wall bracket cover 100 fits over the wall bracket 90 and is held securely in place at a plurality of points. The wall cover catch 118 fits over wall bracket catch 98. The top piece 120 of the wall cover, in addition to having the wall cover catch 118, is provided with a vertical flat piece 124. The vertical flat piece 124 ends with a gripping leg 126. This gripping leg 126 matingly engages and holds the gripping leg 102 of the wall bracket 90. When the wall bracket cover 100 is placed on the wall bracket 90 a cavity 128 is formed between the flat piece 92 and flat piece 124 of the wall bracket cover. The cavity 128 is functional in that it allows electrical wires, rubber tubing or any conduits to be passed around the room while prohibiting these conduits from being unnecessarily contaminated. Loose and open wires always have the potential for trouble and the fact that the conduits may be safely carried around the room without being open to the atmosphere is extremely beneficial. Additionally, the cavity 128 withdraws from the room the unsightly wires that tend to give a person or patient the feeling of lack of order or organization. As previously mentioned, the patient's morale in a hospital is often a crucial determining factor in the patient's physical health.

While the preferred embodiment of the invention has been disclosed, it is understood that the invention is not limited to such an embodiment since may be otherwise embodied in the scope of the appended claims.

What is claimed is:

1. A wall rail for providing support to a storage unit which is removeably secured thereto, said wall rail comprising a mounting bracket fixedly fastened to a wall and a cover means, said cover means having securing means for selectively and removeably attaching said cover means to said mounting bracket, said mounting bracket and cover means forming a U-shaped channel, the first leg of said U-shaped channel substantially coplanar with a wall to which said wall rail is secured, and the top surface of the second leg of said U-shaped channel providing a contact surface which contact surface provides support for said storage unit.

2. A wall rail as claimed in claim 1 wherein the mounting bracket comprises a flat surface, coplanar with a wall to which said wall rail is secured, said flat surface defining apertures for fasteners.

3. A wall rail as claimed in claim 2 wherein the cover means is provided with a flat surface at substantially the same height as the flat surface of the said mounting bracket the flat surface of said cover means a flat surface of said mounting bracket defining a cavity therebetween said cavity providing a trackway for an assortment of life support conduits.

4. A wall rail as claimed in claim 1 wherein the second leg of said U-shaped channel is obliquely oriented with respect to the wall to which the mounting bracket is secured.

5. A wall rail as claimed in claim 5 wherein the second leg of said U-shaped channel is supported by a ledge extending from the first leg of said U-shaped channel.

6. A wall rail as claimed in claim 1 wherein the mounting bracket is provided with an extending finger beneath the first leg of said U-shaped channel which extending finger provides a securing point for the cover means.

7. A wall rail as claimed in claim 6 wherein the cover means is provided with an undercut which undercut is positioned beneath the base of said extending finger and serves to secure said cover means to said mounting bracket.

8. A wall rail for providing support to storage units removeably attached thereto comprising a mounting bracket, said mounting bracket comprising a first surface which is coplanar with and permanently secured to a wall and second surface also coplanar to said wall, said second surface having a support ledge extending therefrom and an upwardly inclined leg extending from said support ledge, a cover means selectively and removeably securable to said mounting bracket, said cover means comprising a surface in justaposition to said first surface of said mounting bracket which, when mounted to said mounting bracket forms a cavity, a second surface support ledge and inclined leg, said cavity providing a raceway for an assortment of life supporting conduits, with the top of said inclined leg forming a horizontal contact surface which provides support for said storage units.

9. A wall rail as claimed in claim 8 wherein the first surface of said mounting bracket is provided with apertures for fastening said mounting bracket to a wall.

10. A wall rail as claimed in claim 8 wherein the cover means is removeably secured to the mounting bracket at a plurality of points.

* * * * *